United States Patent
Uda et al.

(10) Patent No.: US 11,196,293 B2
(45) Date of Patent: Dec. 7, 2021

(54) POWER SUPPLY SYSTEM WITH UNINTERRUPTIBLE POWER SUPPLY FUNCTION AND LOAD LEVELING FUNCTION

(71) Applicant: NISSIN ELECTRIC CO., LTD., Kyoto (JP)

(72) Inventors: Satoshi Uda, Kyoto (JP); Yoshinori Kawasaki, Kyoto (JP); Shoji Nishimura, Kyoto (JP)

(73) Assignee: NISSIN ELECTRIC CO., LTD., Kyoto (JP)

( * ) Notice: Subject to any disclaimer, the term of this patent is extended or adjusted under 35 U.S.C. 154(b) by 37 days.

(21) Appl. No.: 16/643,851

(22) PCT Filed: Aug. 27, 2018

(86) PCT No.: PCT/JP2018/031601
§ 371 (c)(1),
(2) Date: Mar. 3, 2020

(87) PCT Pub. No.: WO2019/044774
PCT Pub. Date: Mar. 7, 2019

(65) Prior Publication Data
US 2021/0066958 A1 Mar. 4, 2021

(30) Foreign Application Priority Data
Sep. 4, 2017 (JP) .............................. JP2017-169664

(51) Int. Cl.
*H02J 9/06* (2006.01)

(52) U.S. Cl.
CPC .............. *H02J 9/068* (2020.01); *H02J 9/062* (2013.01); *H02J 9/066* (2013.01); *H02J 2300/24* (2020.01)

(58) Field of Classification Search
CPC .. H02J 9/062; H02J 9/066; H02J 9/068; H02J 2300/24
(Continued)

(56) References Cited

U.S. PATENT DOCUMENTS

| 4,686,382 A | * | 8/1987 | Shuey | ...................... | H04B 3/56 |
| | | | | | 307/149 |
| 5,994,794 A | * | 11/1999 | Wehrlen | .................. | H02J 9/066 |
| | | | | | 307/66 |

(Continued)

FOREIGN PATENT DOCUMENTS

| CN | 102969742 | 3/2013 |
| JP | S5066130 | 6/1975 |

(Continued)

OTHER PUBLICATIONS

"Office Action of India Counterpart Application", dated Nov. 18, 2020, p. 1-p. 5.

(Continued)

*Primary Examiner* — Yemane Mehari
(74) *Attorney, Agent, or Firm* — JCIPRNET

(57) ABSTRACT

Provided is a power supply system comprising: distributed energy resources (2) connected to a power line (L1) for feeding power from a commercial power system (10) to an important load (30); a switch (3) provided in the power line (L1) for opening and closing the power line (L1); an impedance element (4) connected in parallel to the switch (3) in the power line (L1); a voltage detection unit (5) for detecting a voltage on the commercial power system (10) side with respect to the switch (3); and a control unit (6) for releasing, when a voltage detected by the voltage detection unit (5) becomes equal to or lower than a set point, the switch (3) such that the distributed energy resources (2) and the commercial power system (10) are connected through the impedance element (4), and the distributed energy (Continued)

resources (2) continue operation including reverse power flow.

7 Claims, 14 Drawing Sheets

(58) Field of Classification Search
USPC .......................................................... 323/371
See application file for complete search history.

(56) References Cited

U.S. PATENT DOCUMENTS

| | | | | |
|---|---|---|---|---|
| 6,134,124 | A | 10/2000 | Jungreis et al. | |
| 7,391,132 | B2* | 6/2008 | Chen ........................ | H02J 9/062 |
| | | | | 307/43 |
| 2016/0006295 | A1* | 1/2016 | Yang .......................... | H02J 7/34 |
| | | | | 307/66 |
| 2017/0179759 | A1* | 6/2017 | Johansen ................. | H02J 9/062 |

FOREIGN PATENT DOCUMENTS

| | | |
|---|---|---|
| JP | 2000184602 | 6/2000 |
| JP | 3402886 | 5/2003 |
| JP | 2004289980 | 10/2004 |
| JP | 2016059168 | 4/2016 |
| JP | 2016208586 | 12/2016 |
| JP | 2017055508 | 3/2017 |

OTHER PUBLICATIONS

"International Search Report (Form PCT/ISA/210) of PCT/JP2018/031601," dated Nov. 6, 2018, with English translation thereof, pp. 1-4.

Ravi Bhatt et al., "Grid Frequency and Voltage Support using PV Systems with Energy Storage", 2011 North American Power Symposium, Aug. 4, 2011, pp. 1-6.

"Search Report of Europe Counterpart Application", dated Feb. 8, 2021, p. 1-p. 9.

* cited by examiner

| No. | Conditions of frequency tolerance of distributed power supply and important load | | Opening/closing of changeover switch | Operation of distributed power supply |
|---|---|---|---|---|
| (1) | When both distributed power supply and important load satisfy frequency tolerance of frt requirements | Frequency variation ≤ frt requirements | Closed | Operation is continued to follow frequency variation of system |
| (2) | When one of distributed power supply and important load is not within frequency tolerance of frt requirements | Frequency variation < frequency tolerance | Closed | Operation is continued to follow frequency variation of system |
| (3) | | Frequency tolerance < frequency variation < frt requirements | Open | Operation is continued within frequency limit range of smaller frequency tolerance of one of distributed power supply and important load |

POWER SUPPLY SYSTEM WITH UNINTERRUPTIBLE POWER SUPPLY FUNCTION AND LOAD LEVELING FUNCTION

CROSS-REFERENCE TO RELATED APPLICATION

This application is a 371 application of the International PCT application serial no. PCT/JP2018/031601, filed on Aug. 27, 2018, which claims the priority benefits of Japan Patent Application No. 2017-169664, filed on Sep. 4, 2017. The entirety of the abovementioned patent application is hereby incorporated by reference herein and made a part of this specification.

TECHNICAL FIELD

The disclosure relates to a power supply system.

BACKGROUND ART

A power supply system may be classified as an uninterruptible power supply system that is disconnected from a commercial power system to compensate for an important load and a distributed power supply system that realizes load leveling such as peak-cut/peak-shift by charging or discharging a storage battery, at the time of service interruption or momentary power interruption.

With recent improvement in performance of a storage battery, it is conceivable that an uninterruptible power supply function and a load leveling function both be performed in a storage battery system with a large capacity (of a class with a capacity of 500 kW or more). For example, as described in Patent Literature 1, a secondary battery system that can perform both an uninterruptible power supply function and a load leveling function is conceivable. This system is disconnected to supply electric power to an important load at the time of service interruption or momentary power interruption.

Use of distributed power supplies which are connected to a commercial power system has increased, and when such distributed power supplies are simultaneously disconnected at the time of momentary power interruption, there is a likelihood that maintenance of the voltage or frequency of the commercial power system as a whole will be greatly affected. Accordingly, there is demand for continuous operation of such distributed power supplies without disconnection from a commercial power system even at the time of momentary power interruption (fault-ride-through (FRT) requirements).

However, in the above-mentioned power supply system, since disconnection is performed at the time of momentary power interruption, FRT requirements may not be able to be satisfied. As disclosed in Patent Literature 2, it is conceivable that a storage battery for uninterruptible power supply and a storage battery for load leveling be used for a power supply system to construct a system that performs these functions individually, but costs and sizes thereof increase.

CITATION LIST

Patent Literature

[Patent Literature 1]
Japanese Patent No. 3402886
[Patent Literature 2]
Japanese Patent Laid-Open No. 2004-289980

SUMMARY OF INVENTION

Technical Problem

Therefore, the disclosure has been invented to solve the above-mentioned problems and a main objective thereof is to provide a novel power supply system that can perform both an uninterruptible power supply function and a load leveling function in types of continuous commercial power supply using a common distributed power supply while satisfying FRT requirements.

Solution to Problem

That is, a power supply system according to the disclosure is a power supply system that is provided between a commercial power system and an important load and supplies electric power to the important load, the power supply system including: a distributed power supply that is connected to a power line for supplying electric power from the commercial power system to the important load; a changeover switch that is provided closer to the commercial power system than to the distributed power supply in the power line and opens and closes the power line; an impedance element that is connected in parallel to the changeover switch in the power line; a system-side voltage detecting unit that detects a voltage of a part closer to the commercial power system than to the changeover switch; and a control unit that opens the changeover switch and connects the distributed power supply and the commercial power system via the impedance element when a voltage detected by the system-side voltage detecting unit becomes equal to or lower than a predetermined set value, wherein the distributed power supply continues to perform an operation including a reverse power flow in a state in which the distributed power supply and the commercial power system are connected via the impedance element.

In this power supply system, since the changeover switch is provided closer to the commercial power system than to the distributed power supply in the power line, the impedance element is connected in parallel to the changeover switch, and the changeover switch is opened when the voltage of the commercial power system side becomes equal to or less than the set value, consumer-side equipment is connected to the commercial power system via the impedance element even at the time of momentary power interruption. Accordingly, it is possible to prevent a voltage drop in the important load at the time of momentary power interruption while satisfying the FRT requirements of the distributed power supply. As a result, it is possible to provide a novel power supply system that can perform both an uninterruptible power supply function and a load leveling function using a common distributed power supply while satisfying FRT requirements.

Since a parallel circuit part including the impedance element and the changeover switch has only to be provided in the power line, it is possible to simplify a circuit configuration of the device. Since a current flows in the changeover switch at the time of normal operation, it is possible to prevent a loss from being generated in the impedance element such as a reactor.

The FRT requirements include continuous operation with frequency variation in addition to continuous operation with a voltage drop as described above. When the distributed power supply continues to operate in a state in which the changeover switch is closed in the power supply system having the above-mentioned configuration, the distributed power supply continues to perform operation to follow the frequency variation of the commercial power system and the frequency of a voltage and a current to the important load varies. Here, when the frequency tolerance of the important load is less than the frequency range of the FRT requirements, the important load is detached.

Accordingly, the power supply system may further include a frequency variation detecting unit that detects a frequency variation of a part closer to the commercial power system side than to the changeover switch, and, when a frequency tolerance of the important load or the distributed power supply is not within a predetermined set range, the control unit may open the changeover switch and connect the distributed power supply and the commercial power system via the impedance element when the frequency variation detected by the frequency variation detecting unit is equal to or greater than the frequency tolerance and is included in the predetermined set range.

The frequency tolerance is an allowable frequency variation range in which the important load or the distributed power supply can operate. The predetermined set range is a frequency range of the FRT requirements. When the frequency variation is a stepwise increase, for example, the set range is a range (50 Hz to 50.8 Hz, 60 Hz to 61.0 Hz) from a normal frequency (50 Hz or 60 Hz) to a predetermined varied value (50.8 Hz or 61.0 Hz). When the frequency variation is a ramp-like increase or decrease, the set range is a range with a predetermined rate of variation (±2 Hz/sec) from the normal frequency (50 Hz or 60 Hz) and a range up to an upper-limit set value or a lower-limit set value with a predetermined variation.

At this time, the distributed power supply may continue to perform an operation including a reverse power flow within the frequency tolerance range in a state in which the distributed power supply and the commercial power system are connected via the impedance element.

With this configuration, it is possible to prevent detachment of the important load while satisfying the FRT requirements of the distributed power supply for a frequency variation. Specifically, when the distributed power supply is connected to the commercial power system via the impedance element and continues to perform operation in a state in which the voltage of the distributed power supply side is less than a frequency limit in the frequency tolerance, the frequency and phase thereof are different from those of the voltage of the commercial power system side. On the other hand, by curbing a cross current due to such a potential difference and a voltage variation based thereon using the impedance element, it is possible to stabilize the voltage and current to the important load in a state in which the voltage of the important load side is maintained at less than the frequency limit.

As a specific operating aspect of the distributed power supply, the distributed power supply may continue to perform an operation including a reverse power flow within the smaller frequency tolerance range of the important load and the distributed power supply in a state in which the distributed power supply and the commercial power system are connected via the impedance element.

The power supply system may further include a disconnection switch that is provided closer to the commercial power system than to the distributed power supply in the power line, the control unit may open the disconnection switch when the voltage detected by the system-side voltage detecting unit satisfies a predetermined disconnection condition, and the distributed power supply may supply electric power to the important load to enter a self-operation mode in a state in which the disconnection switch is open.

The power supply system may further include a power-supply-side voltage detecting unit that detects a voltage of a part closer to the distributed power supply than to the disconnection switch in the power line, and the control unit may turn on the disconnection switch when the voltage detected by the system-side voltage detecting unit satisfies the predetermined disconnection condition and the voltage detected by the system-side voltage detecting unit and the voltage detected by the power-supply-side voltage detecting unit satisfy a synchronism detection condition. Here, the predetermined synchronism detection condition is a condition that the magnitude, frequency, and phase of the voltage detected by the system-side voltage detecting unit match the magnitude, frequency, and phase of the voltage detected by the power-supply-side voltage detecting unit.

In addition, the power supply system may further include: a system-connection protection device that is provided closer to the commercial power system than to the disconnection switch in the power line; and a power-supply-side voltage detecting unit that detects a voltage of a part closer to the distributed power supply than to the disconnection switch in the power line, and the control unit may turn on the disconnection switch when the system-connection protection device is deactivated and the voltage detected by the system-side voltage detecting unit and the voltage detected by the power-supply-side voltage detecting unit satisfy a synchronism detection condition.

Advantageous Effects of Invention

According to the disclosure having the above-mentioned configurations, it is possible to provide a novel power supply system that can perform both a function of a uninterruptible power supply system and a function of a distributed power supply using a common distributed power supply while satisfying FRT requirements.

BRIEF DESCRIPTION OF DRAWINGS

FIG. 6 is a table illustrating a list of operation states according to the second embodiment.

DESCRIPTION OF EMBODIMENTS

First Embodiment

Hereinafter, a first embodiment of a power supply system according to the disclosure will be described with reference to the accompanying drawings.

Figure 1:
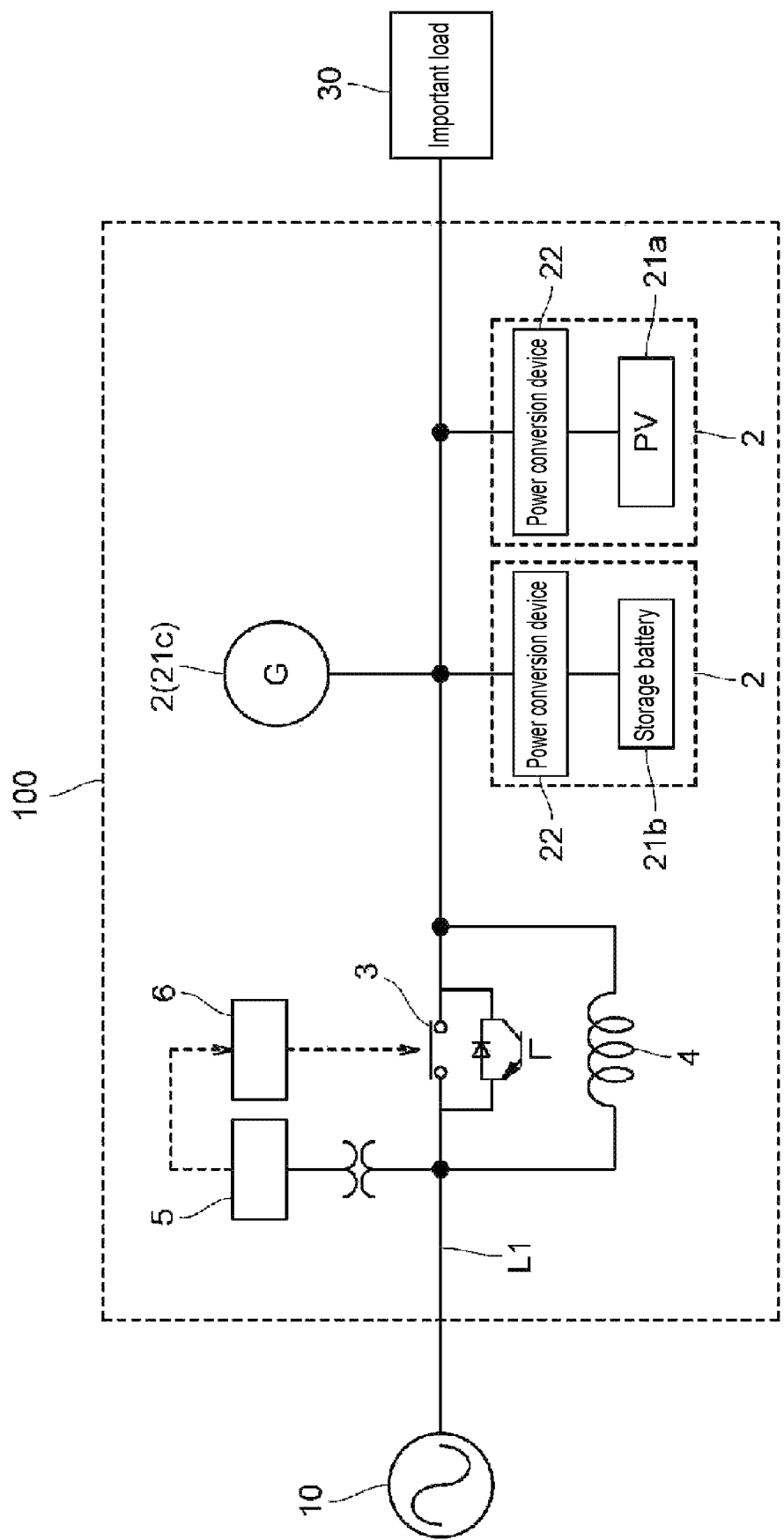
FIG. 1 is a diagram schematically illustrating a configuration of a power supply system according to a first embodiment.

As illustrated in FIG. 1, a power supply system 100 according to an embodiment is provided between a commercial power system 10 and an important load 30 and serves to perform a function of an uninterruptible power supply system (an uninterruptible power supply function) that supplies electric power to the important load 30 when an abnormality occurs in the commercial power system 10 and a function of a distributed power supply system (a load leveling function) that levels a load by causing electric power to flow forward and reversely with respect to a commercial power system.

Here, the commercial power system 10 is a power supply network of an electric power company (an electric operator) and includes a power plant, a power transmission system, and a power distribution system. The important load 30 is a load to which electric power is to be stably supplied even at the time of system abnormality such as service interruption or momentary power interruption and the number of important load is one in FIG. 1 but may be two or more.

Specifically, the power supply system 100 includes a distributed power supply 2, a changeover switch 3 that connects the commercial power system 10, the distributed power supply 2, and the important load 30, an impedance element 4 that is connected in parallel to the changeover switch 3, a system-side voltage detecting unit 5 that detects a voltage of a part closer to the commercial power system 10 than to the changeover switch 3, and a control unit 6 that opens the changeover switch 3 when a voltage detected by the system-side voltage detecting unit 5 becomes equal to or lower than a set value.

The distributed power supply 2 is connected to a power line L1 that is used to supply power from the commercial power system 10 to the important load 30. The distributed power supply 2 is connected to the commercial power system 10 and is, for example, a distributed power supply including a DC power generation facility 21a such as a photovoltaic cell or a fuel cell and a power conversion device 22, a distributed power supply including a power storage device (a power storage device) 21b such as a secondary battery (a storage battery) and a power conversion device 22, a power generation facility (not illustrated) that rectifies electric energy output as AC power from a wind power generator, a micro gas turbine, or the like into DC power and is connected to the system using a power conversion device, or an AC power generation facility 21c such as a synchronous generator or an induction generator. The power supply system 100 includes at least one power storage device 21b and may additionally include one distributed power supply 2 described above.

The changeover switch 3 is provided closer to the commercial power system 10 than to a connection point of the distributed power supply 2 in the power line L1 and serves to open and close the power line L1, and, for example, a changeover switch that can be rapidly switched such as a semiconductor switch or a hybrid switch in which a semiconductor switch and a mechanical switch are combined can be used. For example, when a semiconductor switch is used, a switching time can be set to be equal to or less than 2 ms and the changeover switch can be shut off regardless of a zero point. When a hybrid switch is used, the switching time can be set to be equal to or less than 2 ms, the changeover switch can be shut off regardless of a zero point, and a power-supply loss can be made to be zero. Opening and closing of the changeover switch 3 is controlled by the control unit 6.

The impedance element 4 is connected in parallel to the changeover switch 3 in the power line L1 and is a current-limiting reactor in this embodiment.

The system-side voltage detecting unit 5 serves to detect a voltage on a part closer to the commercial power system 10 than to the changeover switch 3 in the power line L1 using a voltage transformer. Specifically, the system-side voltage detecting unit 5 is connected to a part closer to the commercial power system 10 than to a parallel circuit including the changeover switch 3 and the impedance element 4 via the voltage transformer.

The control unit 6 serves to compare the voltage detected by the system-side voltage detecting unit 5 with a predetermined set value and to output a control signal to the changeover switch 3 to open the changeover switch 3 when the detected voltage is equal to or lower than the set value. The set value in this embodiment is a voltage value for detecting momentary power interruption. By allowing the control unit 6 to open the changeover switch 3 in this way, the commercial power system 10, the distributed power supply 2, and the important load 30 are connected to each other via the impedance element 4. In this state, the distributed power supply continues to perform an operation including a reverse power flow.

The operation of the power supply system 100 according to this embodiment (at the time of normal operation and at the time of momentary power interruption) will be described below.

Figure 2:
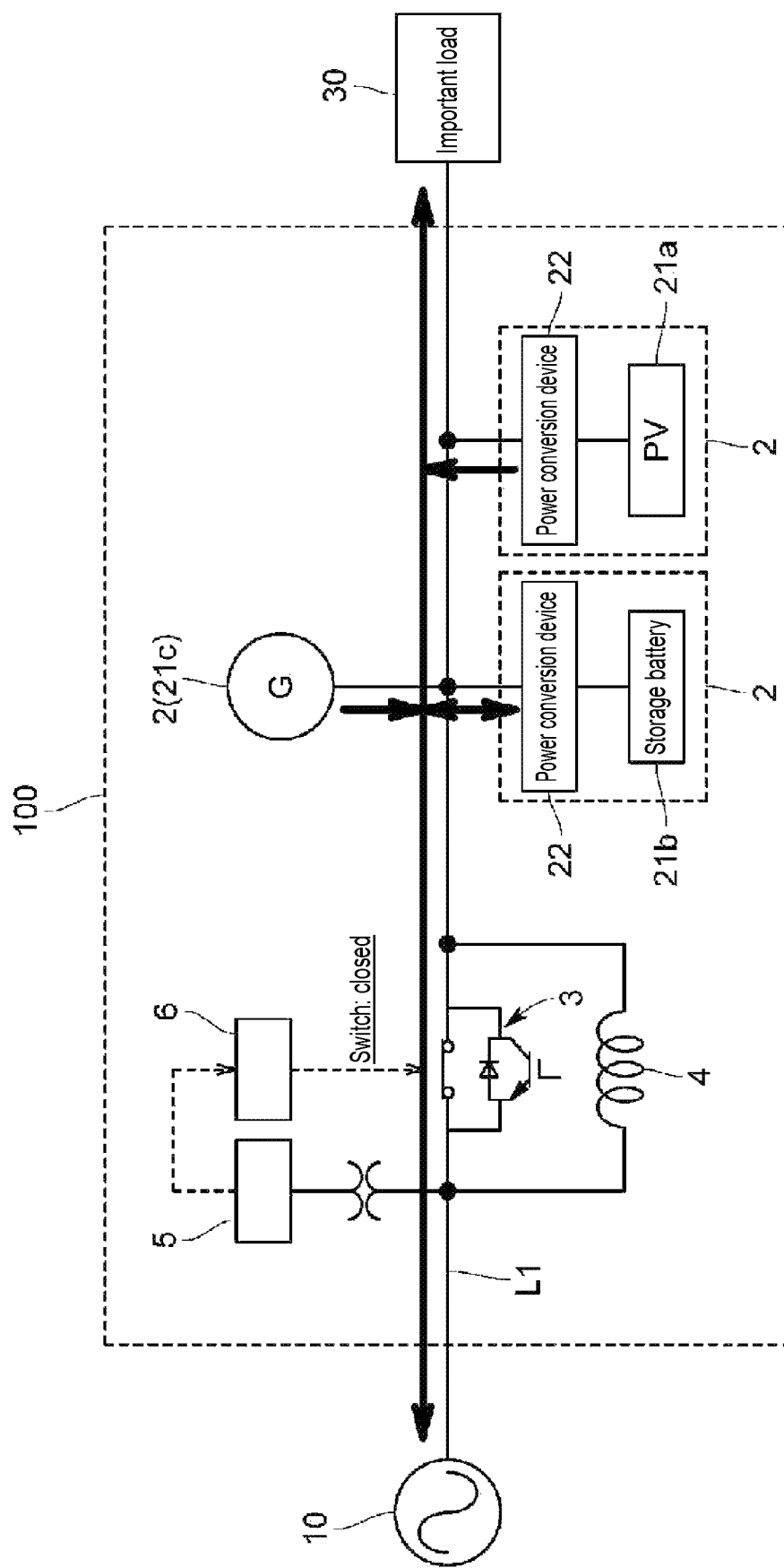
FIG. 2 is a diagram schematically illustrating a state of the power supply system at the time of normal operation according to the first embodiment.

At the time of normal operation of the power supply system 100, as illustrated in FIG. 2, the changeover switch 3 is closed, and the distributed power supply 2 and the important load 30 are connected to the commercial power system 10 via the changeover switch 3. The reactor 4 is connected in parallel to the changeover switch 3, but since an impedance of the changeover switch 3 is smaller than an impedance of the reactor 4, the commercial power system 10, the distributed power supply 2, and the important load 30 give and take power via the changeover switch 3 side. Peak-cut/peak-shift can be realized by a reverse power flow due to the distributed power supply 2.

On the other hand, when a short-circuit accident (for example, a three-phase short circuit) occurs on the commercial power system 10 side, the voltage of the commercial power system 10 side decreases. This voltage drop is detected by the system-side voltage detecting unit 5. When the voltage detected by the system-side voltage detecting unit 5 is equal to or lower than the set value, the control unit 6 opens the changeover switch 3.

Figure 3:
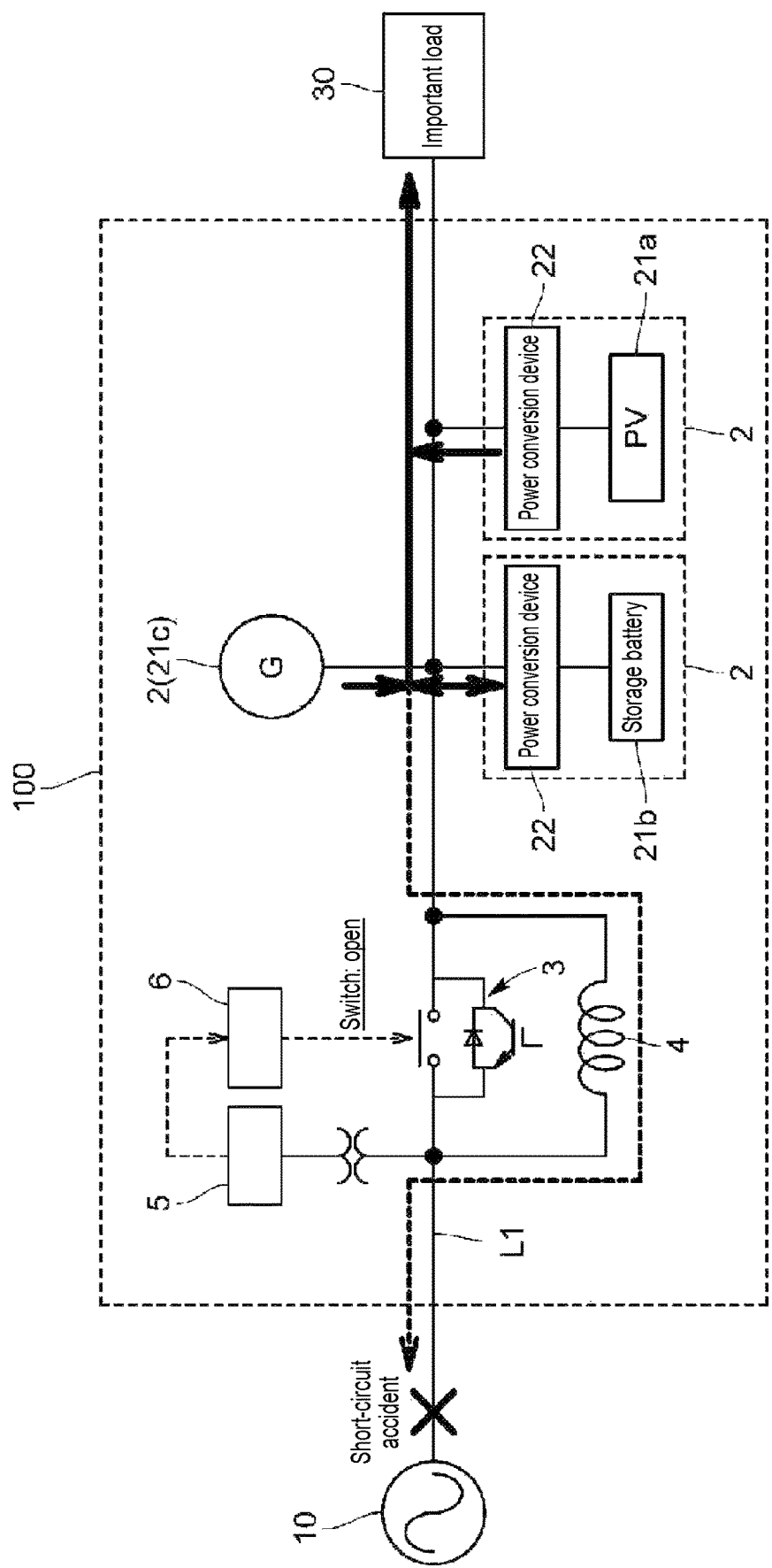
FIG. 3 is a diagram schematically illustrating a state of the power supply system at the time of momentary power interruption according to the first embodiment.

As illustrated in FIG. 3, when the changeover switch 3 is opened, the distributed power supply 2 and the important load 30 are connected to the commercial power system 10 via the reactor 4. In this state, a current flowing from the distributed power supply 2 to a short-circuit accident point is limited by the reactor 4, an accident current flowing to the short-circuit accident point is curbed and a voltage drop of the important load 30 is prevented. In this state, the distributed power supply 2 continues to perform an operation including a reverse power flow and continues to perform power generation and output.

The system-side voltage detecting unit 5 detects the voltage on the commercial power system 10 side regardless of opening or closing of the changeover switch 3. When the voltage detected by the system-side voltage detecting unit 5 becomes equal to or higher than a predetermined restored voltage, for example, when a residual voltage of the commercial power system becomes equal to or greater than 80%, the control unit 6 closes the changeover switch 3.

Figure 4:
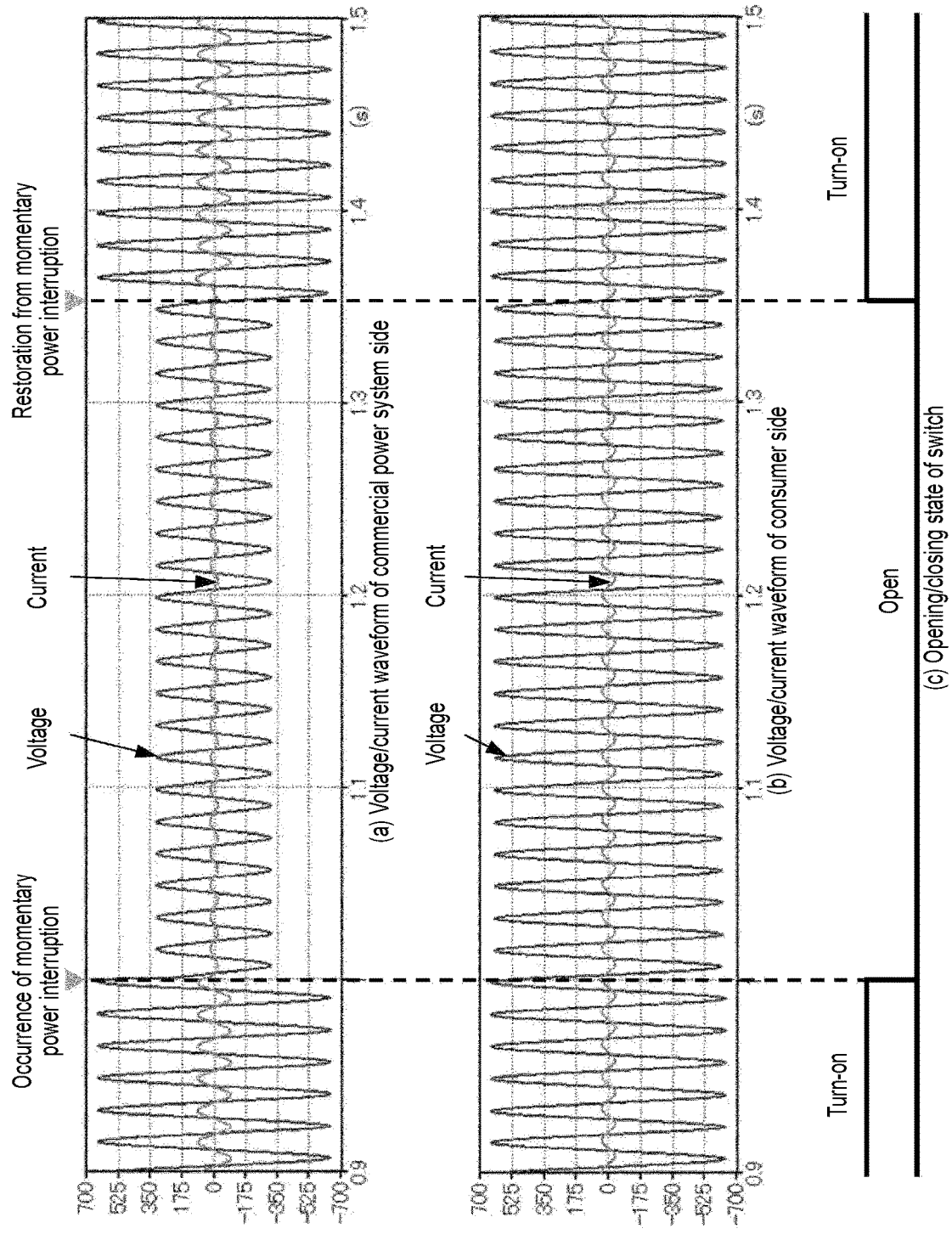
FIG. 4 is a diagram illustrating a result of simulation of a compensation operation at the time of momentary power interruption.

A result of simulation of a compensation operation at the time of momentary power interruption of the power supply system 100 having the configuration illustrated in FIG. 1 is illustrated in FIG. 4.

The result of simulation of a compensation operation represents (a) voltage/current waveforms of the commercial power system side, (b) voltage/current waveforms of a consumer side, and (c) opening/closing of the changeover switch when a voltage drop of 50% is maintained for 0.35 seconds. The voltage/current waveforms of the commercial power system side indicate a voltage and a current which are detected in a part closer to the commercial power system than to the changeover switch in the power line, and the voltage/current waveforms of the consumer side indicate a voltage and a current which are detected in a part closer to the important load than to the distributed power supply in the power line.

From the result of simulation illustrated in FIG. 4, it was ascertained that it is possible to supply constant voltage and current (electric power) to the important load 30 without disconnecting the distributed power supply 2 and the important load 30 from the commercial power system 10 by opening the changeover switch 3 at the time of occurrence of momentary power interruption and interposing the impedance element 4 between the commercial power system 10, the distributed power supply 2, and the important load 30.

With the power supply system 100 according to this embodiment having the above-mentioned configuration, since the changeover switch 3 is provided closer to the commercial power system 10 than to the distributed power supply 2 in the power line L1, the reactor 4 is connected in parallel to the changeover switch 3, and the changeover switch 3 is opened when the voltage of the commercial power system 10 side becomes equal to or lower than the set value, the distributed power supply 2 and the important load 30 are connected to the commercial power system 10 via the reactor 4 even at the time of occurrence of momentary power interruption. Accordingly, in the power supply system 100, since the distributed power supply 2 and the important load 30 are not disconnected from the commercial power system 10 at the time of normal operation and at the time of momentary power interruption, it is possible to prevent a voltage drop in the important load 30 at the time of momentary power interruption while satisfying the FRT requirements of the distributed power supply 2. As a result, it is possible to provide a novel power supply system 100 that can perform both an uninterruptible power supply function and a load leveling function using a common distributed power supply 2 while satisfying the FRT requirements.

In addition, since a parallel circuit part including the reactor 4 and the changeover switch 3 has only to be provided in the power line L1, it is possible to simplify the circuit configuration of the system 100. Since a current flows in the changeover switch 3 at the time of normal operation, it is possible to prevent a loss which is generated in the reactor 4.

Second Embodiment

A second embodiment of the power supply system according to the disclosure will be described below with reference to the accompanying drawings.

The power supply system 100 according to this embodiment satisfies FRT requirements for a frequency variation in addition to the FRT requirements for a voltage drop in the first embodiment.

Figure 5:
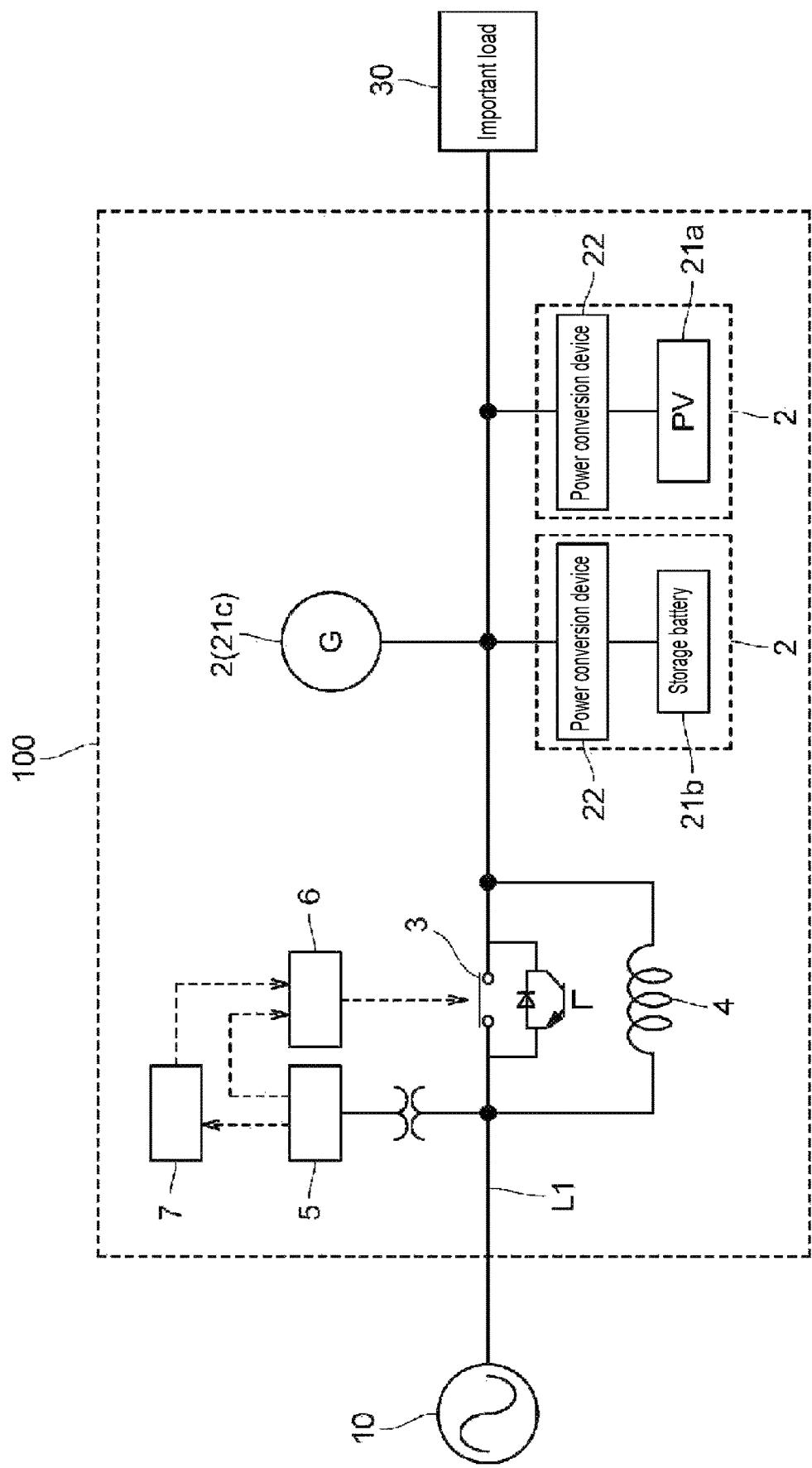
FIG. 5 is a diagram schematically illustrating a configuration of a power supply system according to a second embodiment.

Specifically, the power supply system 100 according to the second embodiment includes a frequency variation detecting unit 7 that detects a frequency variation in a part closer to the commercial power system 10 than to the changeover switch 3 in addition to the configuration according to the first embodiment as illustrated in FIG. 5. The frequency variation detecting unit 7 serves to detect a frequency variation (a frequency increase (OF) or a frequency decrease (UF)) from the voltage detected by the system-side voltage detecting unit 5.

The control unit 6 controls opening and closing of the changeover switch 3 on the basis of the frequency variation detected by the frequency variation detecting unit 7. This frequency variation is, for example, a stepwise increase or a ramp-like increase or decrease.

Figure 7A:
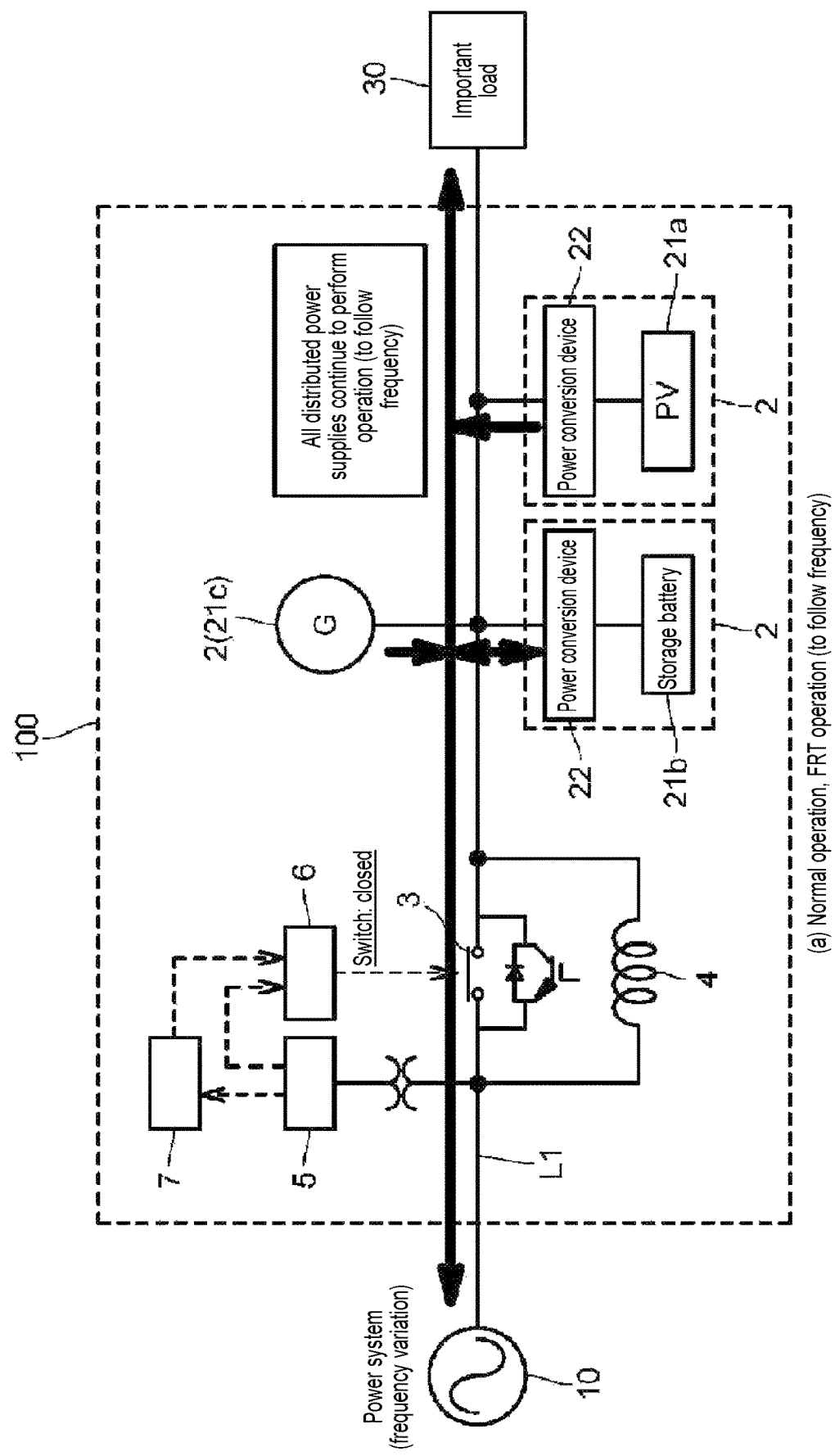
FIG. 7A and FIG. 7B are diagrams schematically illustrating a state of the power supply system at the time of normal operation and at the time of frequency variation according to the second embodiment.
Figure 7B:
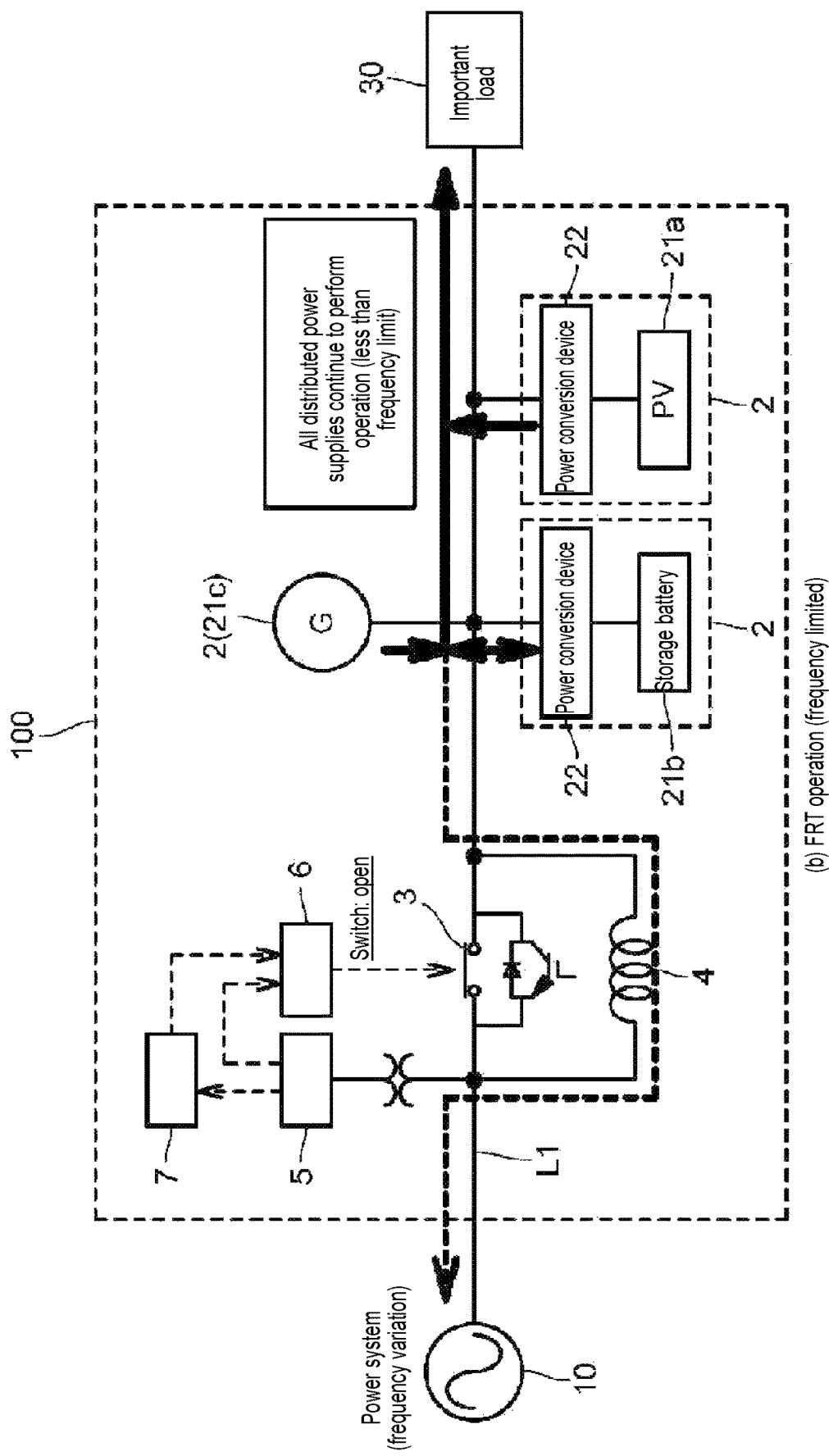

The operation of the distributed power supply 2 along with opening/closing control of the changeover switch 3 which is performed by the control unit 6 will be described below with reference to FIGS. 6 and 7.

(1) When the frequency tolerance of the distributed power supply 2 and the important load 30 satisfies a frequency range (a predetermined set range) of the FRT requirements and the frequency variation of the commercial power system 10 is within the frequency range of the FRT requirements ((1) in FIG. 6), the control unit 6 maintains the state in which the changeover switch 3 is turned on. At this time, the distributed power supply 2 continues to operate to follow the frequency variation of the commercial power system 10 ((a) of FIG. 7A).

(2) When the frequency tolerance of at least one of the distributed power supply 2 and the important load 30 is not within the frequency range of the FRT requirements and the frequency variation of the commercial power system 10 is less than the smaller frequency tolerance ((2) in FIG. 6), the control unit 6 maintains the state in which the changeover switch 3 is turned on. At this time, the distributed power supply continues to operate to follow the frequency variation of the commercial power system ((a) of FIG. 7A).

(3) When the frequency tolerance of at least one of the distributed power supply 2 and the important load 30 is not within the frequency range of the FRT requirements and the frequency variation of the commercial power system 10 is equal to or greater than the smaller frequency tolerance and is within the frequency range of the FRT requirements ((3) in FIG. 6), the control unit 6 opens the changeover switch 3. Then, the distributed power supply 2 and the important load 30 are connected to the commercial power system 10 via the reactor 4. At this time, when the operation is continuously performed in a state in which the voltage of the distributed power supply 2 is less than the frequency limit, the frequency and phase thereof are different from those of the system-side voltage. On the other hand, a cross current due to a potential difference and a voltage variation based thereon are curbed by the reactor 4, it is possible to stabilize supply of power to the important load 30 in a state in which the voltage of the important load side is maintained less than the frequency limit ((b) of FIG. 7B).

The frequency variation detecting unit 7 detects the frequency variation of the commercial power system 10 regardless of opening or closing of the changeover switch 3, and the control unit 6 closes the changeover switch 3 when the frequency variation of the commercial power system 10 becomes less than the smaller frequency tolerance.

With the power supply system 100 according to this embodiment having the above-mentioned configuration, it is possible to prevent detachment of the important load while satisfying the FRT requirements of the distributed power supply for the frequency variation as well as to achieve the same advantageous effects as in the first embodiment.

Third Embodiment

A third embodiment of the power supply system according to the disclosure will be described below with reference to the accompanying drawings.

Figure 8:
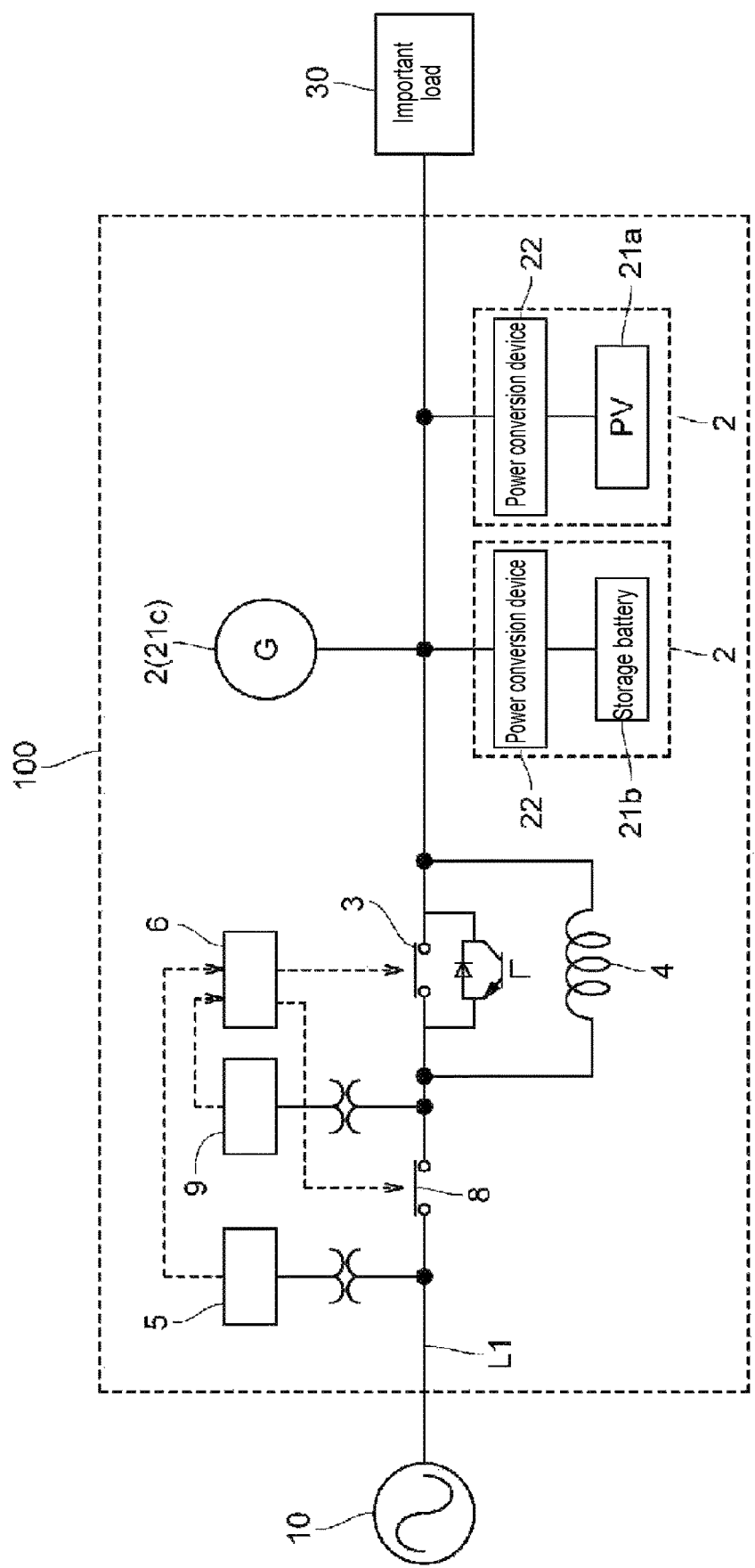
FIG. 8 is a diagram schematically illustrating a configuration of a power supply system according to a third embodiment.

Although not described in the first and second embodiments, in the power supply system 100, a disconnection switch 8 is provided closer to the commercial power system 10 than to the distributed power supply 2 in the power line L1 as illustrated in FIG. 8. In the power supply system 100 according to this embodiment, a power-supply-side voltage detecting unit 9 that detects a voltage of a part closer to the distributed power supply 2 than to the disconnection switch 8 in the power line L1 is provided.

The disconnection switch 8 in this embodiment is an on-off switch that disconnects the commercial power system 10 and the distributed power supply 2 and is, for example, a mechanical switch. In FIG. 8, the disconnection switch 8 is provided closer to the commercial power system 10 than to the changeover switch 3, but may be provided closer to the distributed power supply 2 than to the changeover switch 3. Opening and closing of the disconnection switch 8 is controlled by the control unit 6.

When the voltage detected by the system-side voltage detecting unit 5 satisfies a predetermined disconnection condition, the control unit 6 opens the disconnection switch 8. Here, the predetermined disconnection condition is a condition that a duration time of a voltage drop of the system voltage (a state in which the detected voltage is equal to or less than the set value) is equal to or greater than a predetermined value (a time which is longer than a duration time of momentary power interruption). In a state in which the disconnection switch 8 is open, the distributed power supply 2 enters a self-operation mode and supplies electric power to the important load 30. Since the changeover switch 3 is already open, an overcurrent due to opening of the disconnection switch 8 is curbed by the reactor 4.

When the voltage detected by the system-side voltage detecting unit 5 eliminates the predetermined disconnection condition and the voltage detected by the system-side voltage detecting unit 5 and the voltage detected by the power-supply-side voltage detecting unit 9 satisfy a synchronism detection condition, the control unit 6 turns on the disconnection switch 8.

In addition, when a predetermined disconnection condition such as a condition that the frequency variation detected by the frequency variation detecting unit 7 departs from the frequency range of the FRT requirements is satisfied, the control unit 6 also opens the disconnection switch 8. At this time, the control unit turns on the disconnection switch 8 when the detected frequency variation is within the normal range.

Figure 9A:
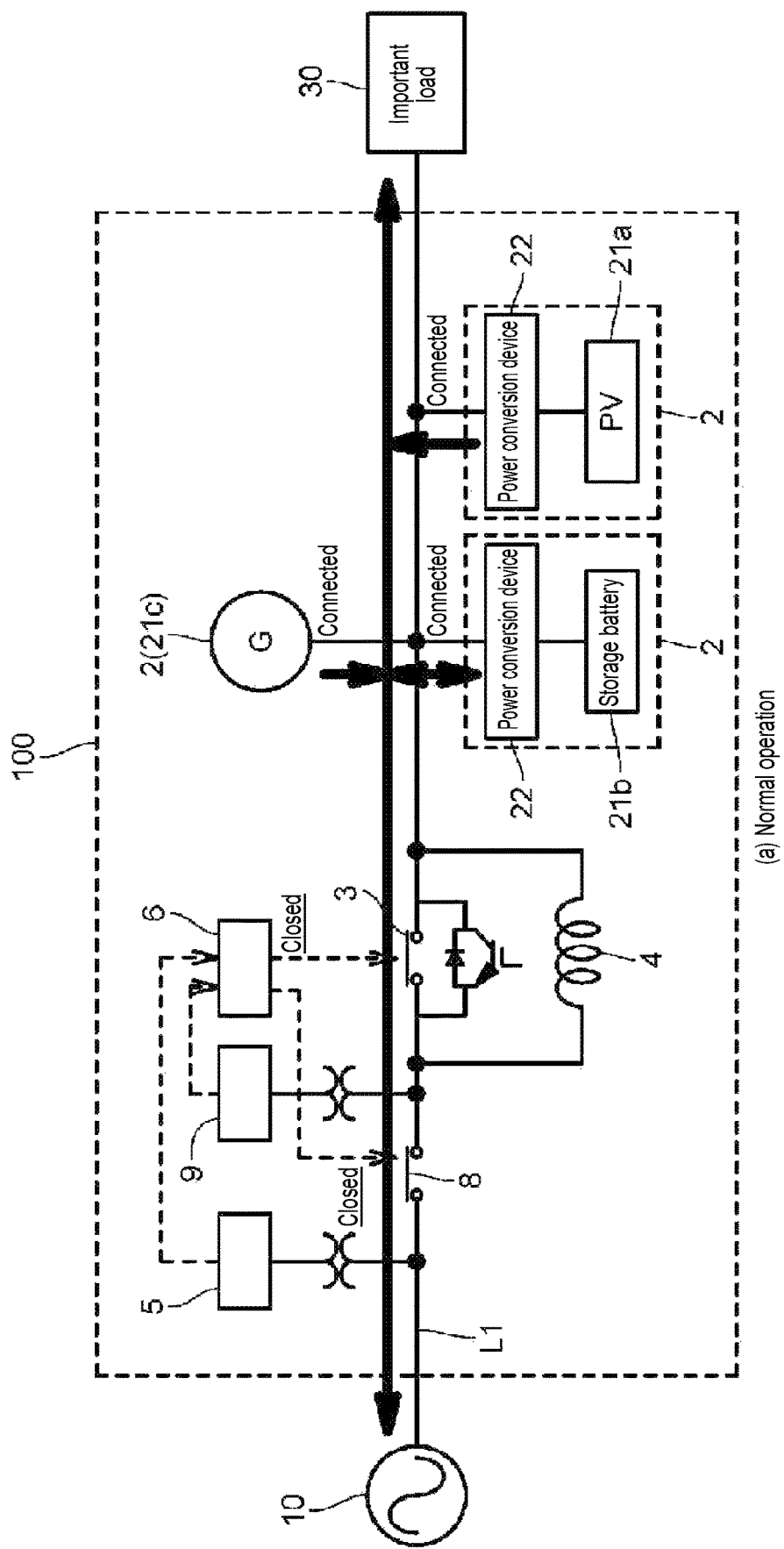
FIG. 9A and FIG. 9B are diagrams schematically illustrating an operation of the power supply system according to the third embodiment.
Figure 9B:
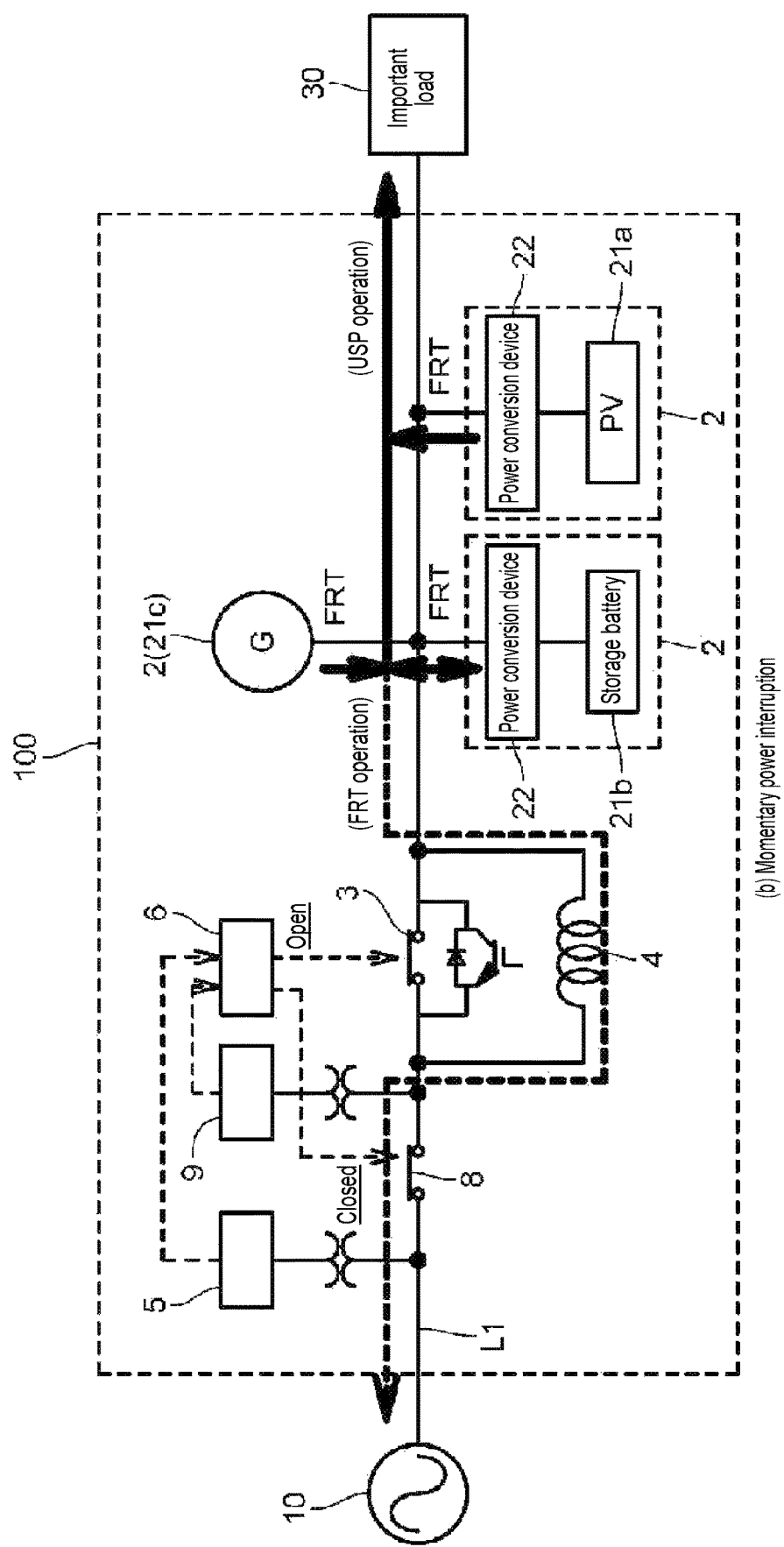
Figure 10A:
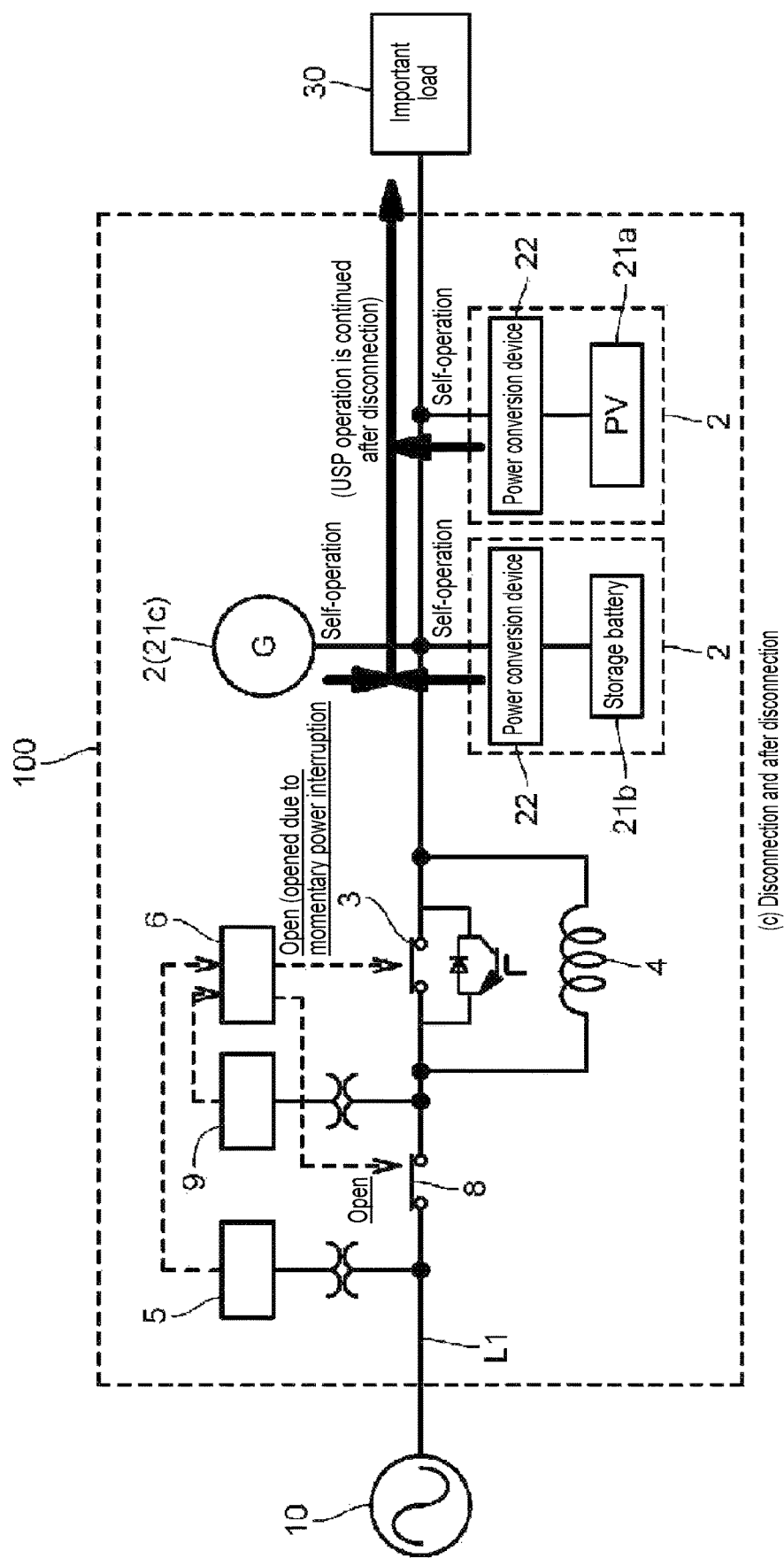
FIG. 10A and FIG. 10B are diagrams schematically illustrating an operation of the power supply system according to the third embodiment.
Figure 10B:
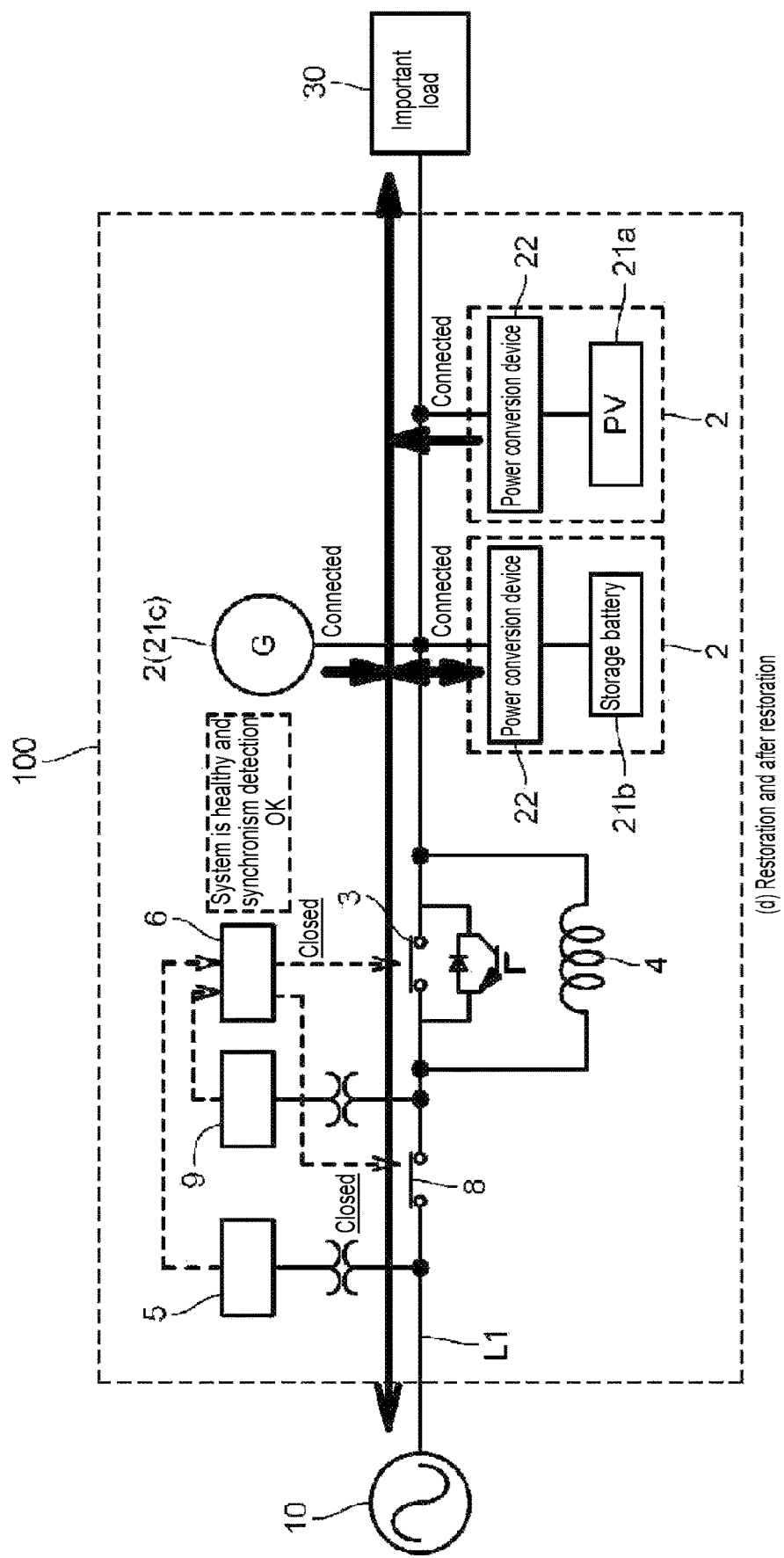

A series of operations in the power supply system 100 will be described below with reference to FIGS. 9 and 10. In the following description, the frequency variation is not considered.

(1) At the time of normal operation

In a state in which the changeover switch 3 and the disconnection switch 8 are closed, the power supply system 100 operates in a system connection manner. The reactor 4 is connected in parallel to the changeover switch 3, but since a current flows in the changeover switch 3 side with a low impedance value, transmission and reception of effective power including a reverse power flow is performed with the commercial power system 10 ((a) of FIG. 9A).

(2) At the time of occurrence of momentary power interruption

When a system voltage drop (UV) is detected using the voltage detected by the system-side voltage detecting unit 5, the control unit 6 opens the changeover switch 3. As a result, the reactor 4 connected in parallel to the changeover switch 3 is inserted, electric power is supplied while maintaining a reverse power flow to limit an overcurrent flowing from the distributed power supply 2 to the commercial power system 10, and a voltage drop of the voltage supplied to the important load 30 is prevented (a uninterruptible power supply (UPS) operation is performed on the important load 30) ((b) of FIG. 9B).

(3) Operation at the time of disconnection and after disconnection due to system voltage drop (which occurs due to system service interruption or the like)

When the voltage detected by the system-side voltage detecting unit 5 satisfies a predetermined disconnection condition, the control unit 6 opens the disconnection switch 8. As a result, the distributed power supply 2 is disconnected from the commercial power system 10 and enters a self-operation mode (an operation mode in which a storage battery is used as a voltage source in FIG. 10A) ((c) of FIG. 10A). Since the changeover switch 3 is already opened, the disconnection switch 8 is opened without an overcurrent.

(4) Operation at the time of health restoration of system (restoration of power)

When the commercial power system is restored to a healthy state by the voltage detected by the system-side voltage detecting unit 5, the control unit 6 turns on the changeover switch 3. Thereafter, when the voltage detected by the system-side voltage detecting unit 5 and the voltage detected by the power-supply-side voltage detecting unit 9 satisfy a synchronism detection condition (the magnitude, frequency, and phase of the voltage of the distributed power supply 2 match the magnitude, frequency, and phase of the voltage of the commercial power system 10), the control unit 6 turns on the disconnection switch 8. Accordingly, (1) the operation at the time of normal operation described above is restarted ((d) of FIG. 10B).

Other Modified Examples

The disclosure is not limited to the above-mentioned embodiments.

Figure 11:
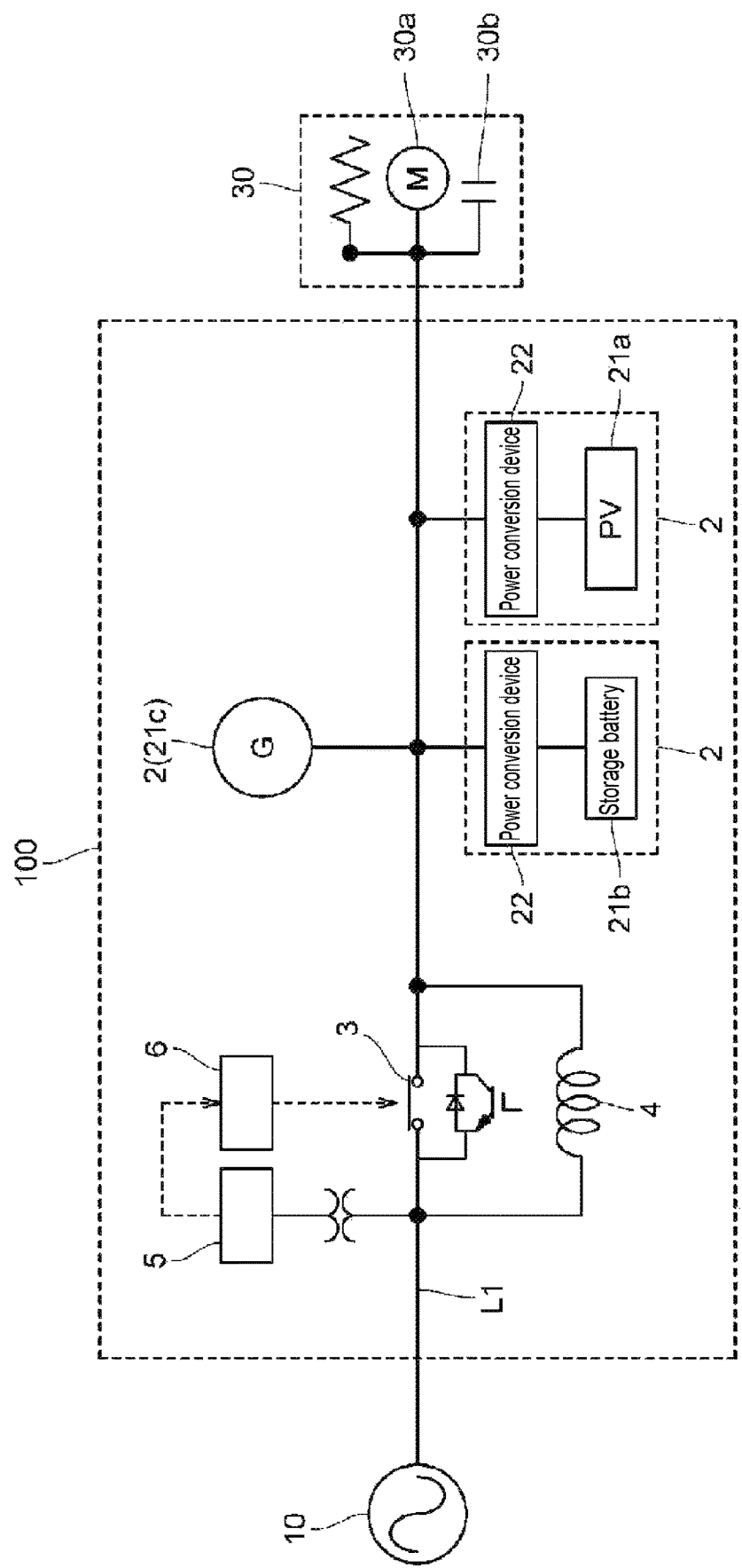
FIG. 11 is a diagram schematically illustrating a configuration of a power supply system according to a modified example.

For example, when the important load 30 includes a motor 30a and a power-factor improvement capacitor 30b that is connected in parallel to the motor 30a as illustrated in FIG. 11, it is thought that a resistor is used as the impedance element 4. In this case, opening and closing control of the changeover switch 3 at the time of normal operation and at the time of momentary power interruption is the same as in the above-mentioned embodiments. With this configuration, it is possible to prevent parallel resonance of the reactor and the power-factor improvement capacitor 30b which is generated when a reactor is used as the impedance element 4 as well as to achieve the same advantageous effects as in the above-mentioned embodiments. A current flows in the resistor at the time of opening of the changeover switch, but since the time in which the changeover switch 3 is open is only several seconds, it is not necessary to cope with a thermal loss due to the resistor.

A capacitor may be used as the impedance element 4, or a combination of two of a reactor, a resistor, and a capacitor may be used.

The system-side voltage detecting unit in the above-mentioned embodiments may be provided in a system-connection protection device. Examples of the system-connection protection device which is defined in system connection regulations include an overvoltage relay (OVR), an undervoltage relay (UVR), a short-circuit direction relay (DSR), a ground-fault overvoltage relay (OVGR), an overfrequency relay (OFR), an underfrequency relay (UFR), and a transfer interrupting device. In this case, it is conceivable that the control unit opens the disconnection switch when any connection protection instrument operates. When all the system-connection protection devices are deactivated and the voltage detected by the system-side voltage detecting unit and the voltage detected by the power-supply-side voltage detecting unit satisfy the synchronism detection condition, the control unit may turn on the disconnection switch. With this configuration, since the voltage detecting unit included in the connection protection instrument is used, it is not necessary to provide a particular system-side voltage detecting unit and thus to simplify a device configuration.

The power-supply-side voltage detecting unit in the above-mentioned embodiments is provided between the disconnection switch and the changeover switch and may be replaced by a function of measuring a system connection point voltage of the distributed power supply.

In addition, the disclosure is not limited to the above-mentioned embodiments and can be modified in various forms without departing from the gist of the disclosure.

INDUSTRIAL APPLICABILITY

According to the disclosure, it is possible to provide a novel power supply system that can perform both an uninterruptible power supply function and a load leveling function in a continuous commercial power supply type using a common distributed power supply while satisfying FRT requirements.

The invention claimed is:

1. A power supply system that is provided between a commercial power system and an important load and supplies electric power to the important load, the power supply system comprising:
   a distributed power supply that is connected to a power line for supplying electric power from the commercial power system to the important load;
   a changeover switch that is provided closer to the commercial power system than to the distributed power supply in the power line and opens and closes the power line;
   an impedance element that is connected in parallel to the changeover switch in the power line;
   a system-side voltage detecting unit that detects a voltage of a part closer to the commercial power system than to the changeover switch; and
   a control unit that opens the changeover switch and connects the distributed power supply and the commercial power system via the impedance element when a voltage detected by the system-side voltage detecting unit becomes equal to or lower than a predetermined set value,
   wherein the distributed power supply continues to perform an operation including a reverse power flow in a state in which the distributed power supply and the commercial power system are connected via the impedance element,
   wherein the power supply system further comprises a frequency variation detecting unit that detects a frequency variation of a part closer to the commercial power system side than to the changeover switch, and
   wherein, when a frequency tolerance of the important load or the distributed power supply is not within a predetermined set range, the control unit opens the changeover switch and connects the distributed power supply and the commercial power system via the impedance element, and when the frequency variation detected by the frequency variation detecting unit is equal to or greater than the frequency tolerance and is included in the predetermined set range.

2. The power supply system according to claim 1, wherein the distributed power supply continues to perform an operation including a reverse power flow within the frequency tolerance range in a state in which the distributed power supply and the commercial power system are connected via the impedance element.

3. The power supply system according to claim 2, wherein the distributed power supply continues to perform an operation including a reverse power flow within the smaller frequency tolerance range of the important load and the distributed power supply in a state in which the distributed power supply and the commercial power system are connected via the impedance element.

4. The power supply system according to claim 1, further comprising a disconnection switch that is provided closer to the commercial power system than to the distributed power supply in the power line,
   wherein the control unit opens the disconnection switch when the voltage detected by the system-side voltage detecting unit satisfies a predetermined disconnection condition, and
   wherein the distributed power supply supplies electric power to the important load in a state in which the disconnection switch is open.

5. The power supply system according to claim 4, further comprising a power-supply-side voltage detecting unit that detects a voltage of a part closer to the distributed power supply than to the disconnection switch in the power line,
   wherein the control unit turns on the disconnection switch when the voltage detected by the system-side voltage detecting unit satisfies the predetermined disconnection condition and the voltage detected by the system-side voltage detecting unit and the voltage detected by the power-supply-side voltage detecting unit satisfy a synchronism detection condition.

6. The power supply system according to claim 4, further comprising:
  a system-connection protection device that is provided closer to the commercial power system than to the disconnection switch in the power line; and
  a power-supply-side voltage detecting unit that detects a voltage of a part closer to the distributed power supply than to the disconnection switch in the power line; and
  wherein the control unit turns on the disconnection switch when the system-connection protection device is deactivated and the voltage detected by the system-side voltage detecting unit and the voltage detected by the power-supply-side voltage detecting unit satisfy a synchronism detection condition.

7. The power supply system according to claim 1, wherein the predetermined set value is a voltage value for detecting momentary power interruption.

\* \* \* \* \*